G. KUWADA.
MACHINE TOOL.
APPLICATION FILED AUG. 21, 1908.
934,079.
Patented Sept. 14, 1909.
4 SHEETS—SHEET 3.
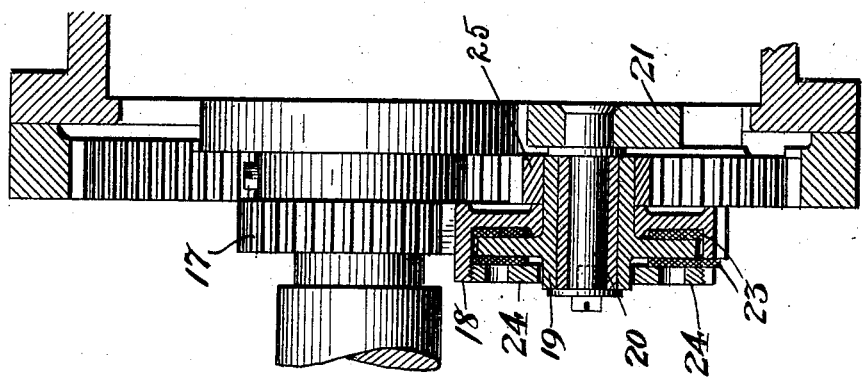
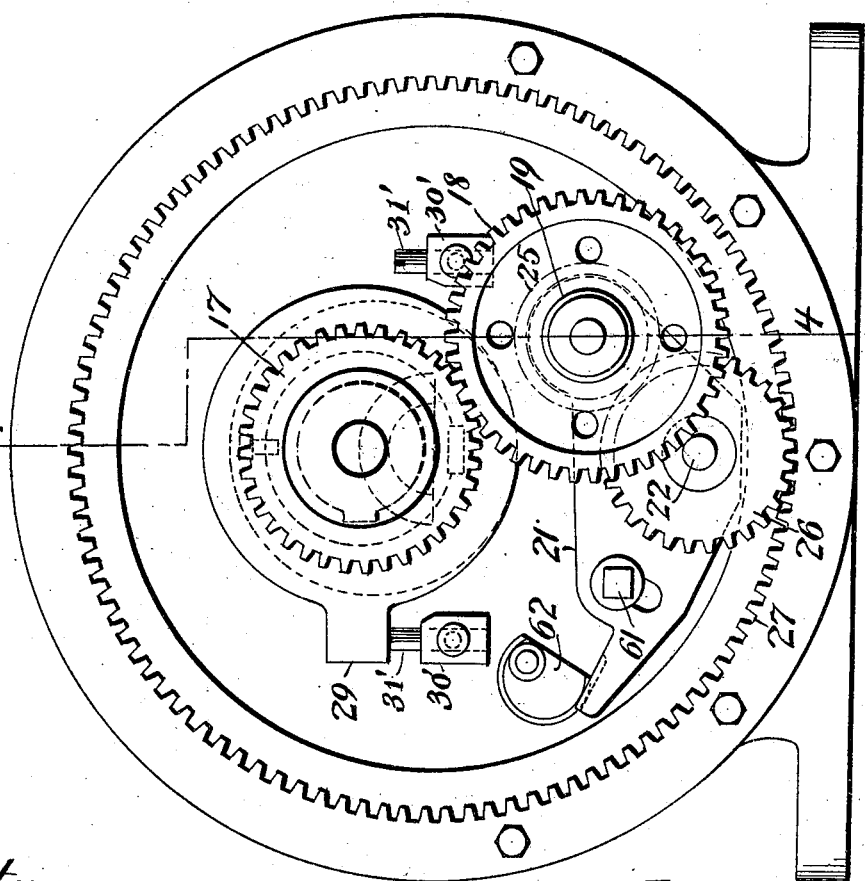
Witnesses.
P. S. Tucker
J. G. Hinkel
Inventor.
Gompei Kuwada
by Howard A. Coombs
Atty.

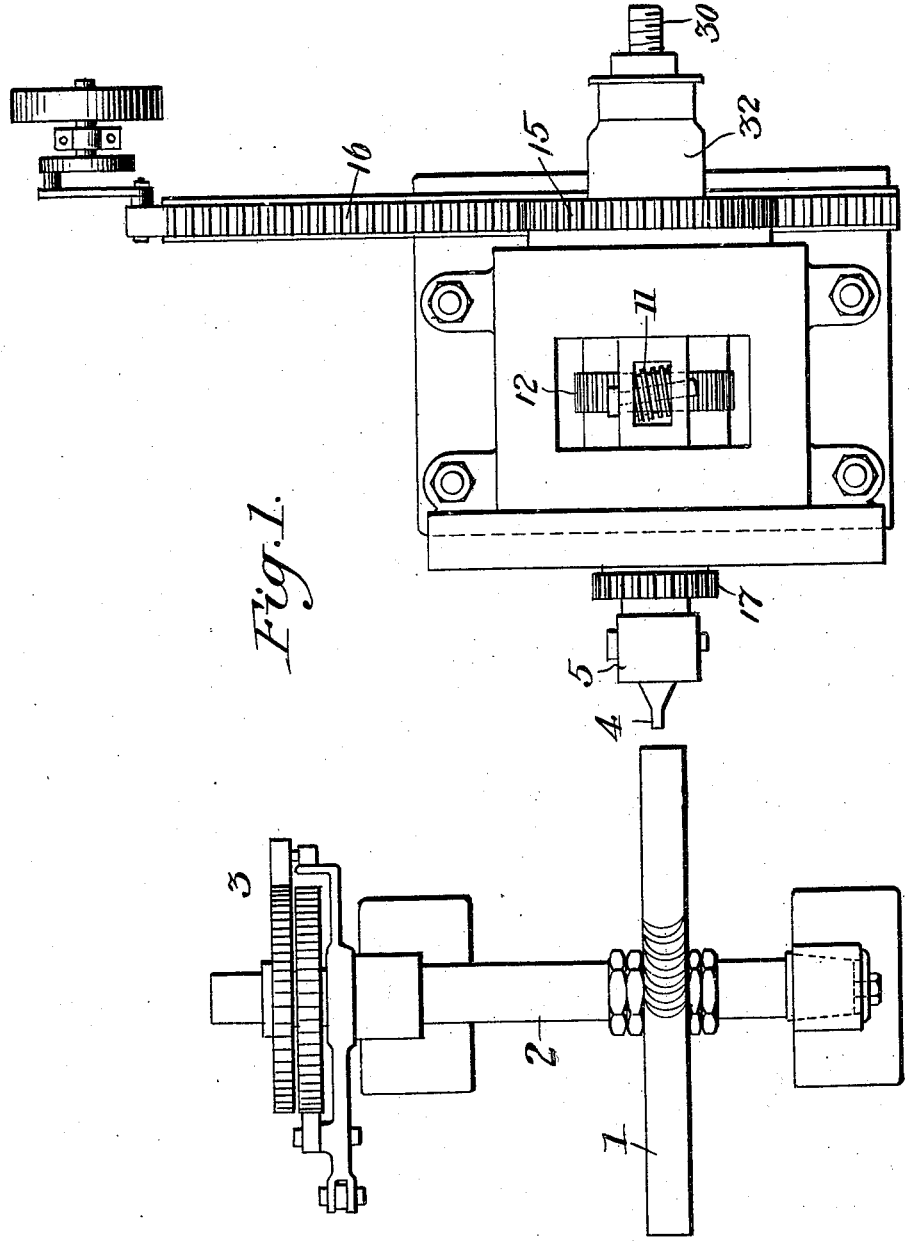

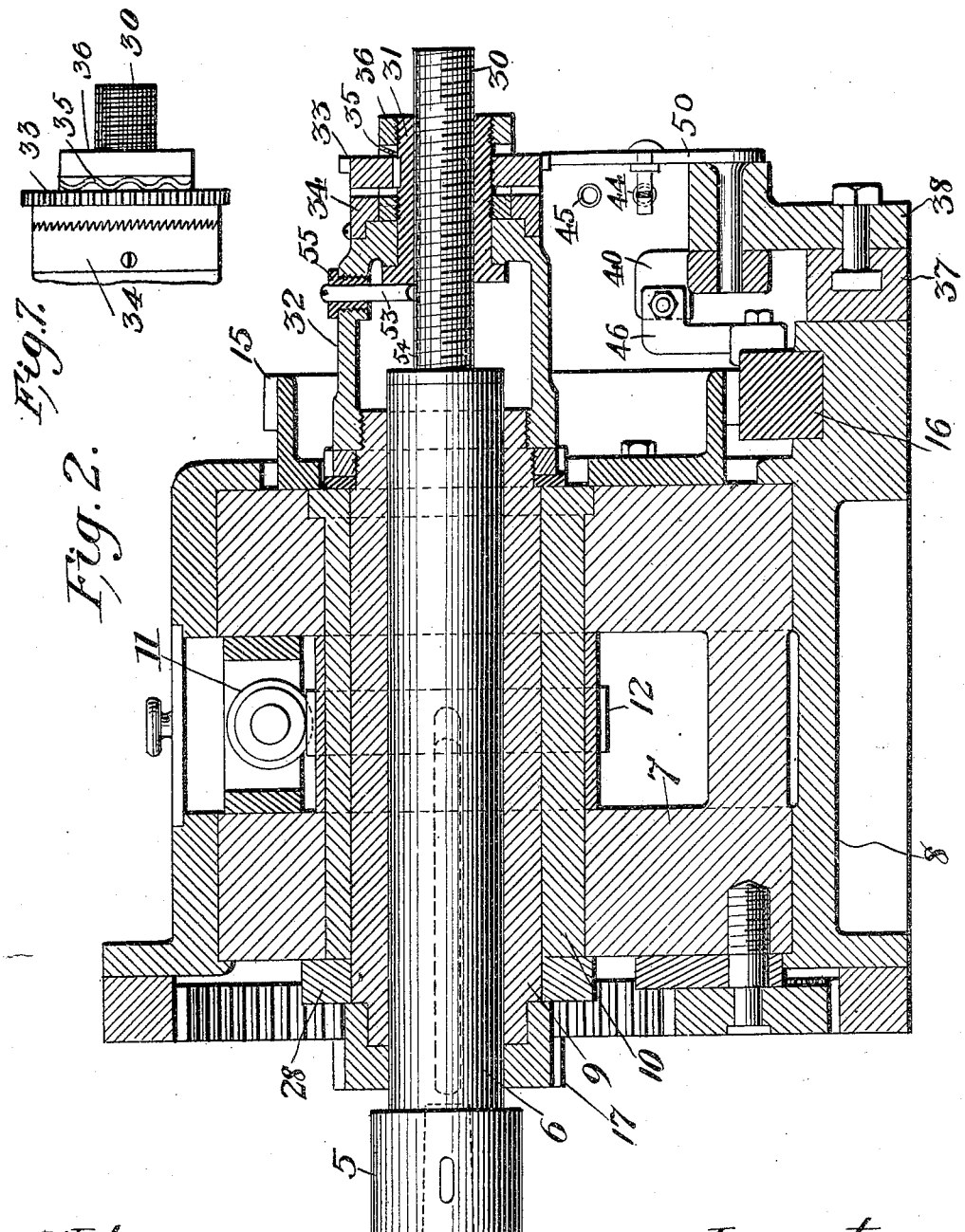

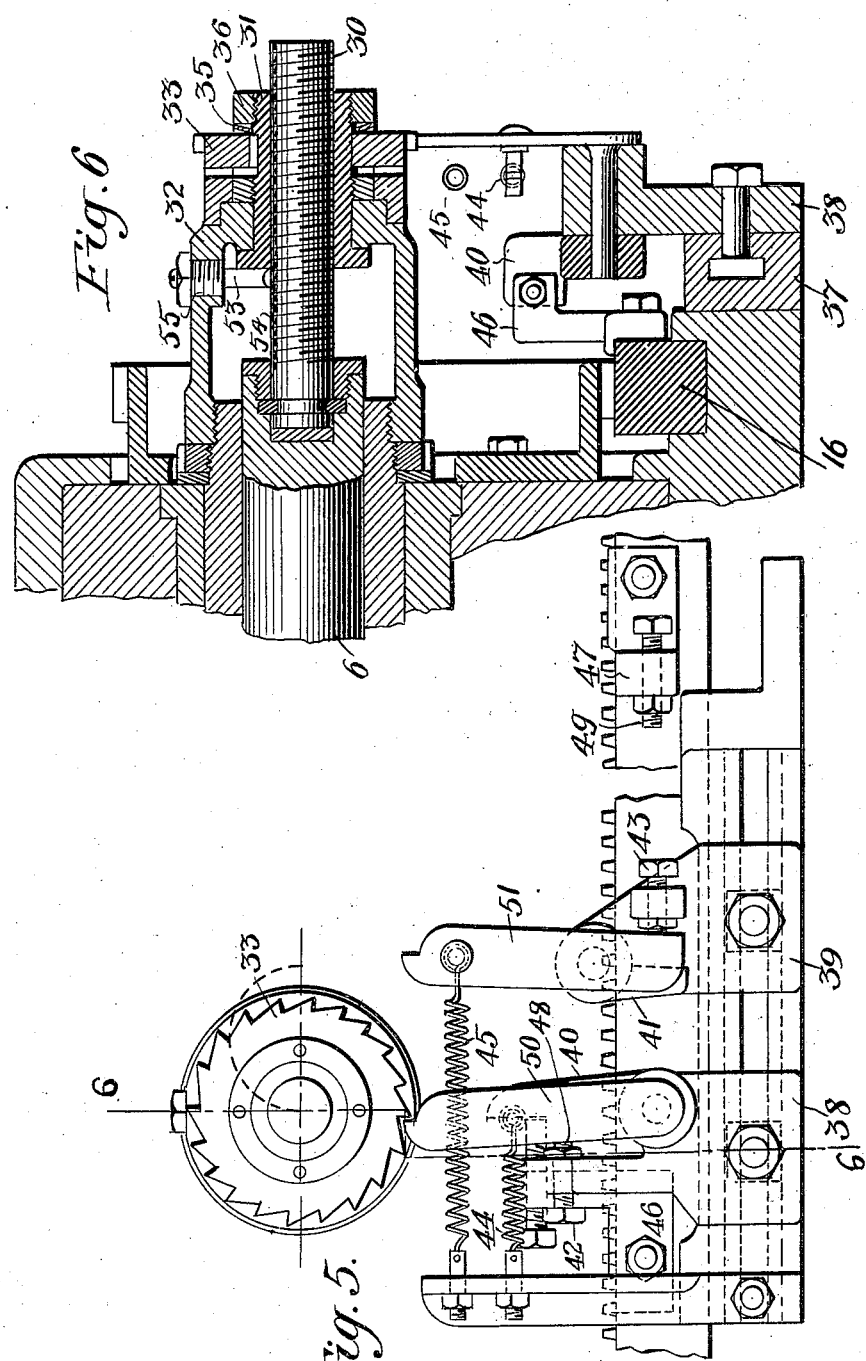

UNITED STATES PATENT OFFICE.

GOMPEI KUWADA, OF KOBE, JAPAN.

MACHINE-TOOL.

934,079. Specification of Letters Patent. Patented Sept. 14, 1909.

Application filed August 21, 1908. Serial No. 449,716.

*To all whom it may concern:*

Be it known that I, GOMPEI KUWADA, a subject of the Japanese Empire, residing at Kobe, Japan, have invented certain new and useful Improvements in Machine-Tools, of which the following is a specification.

My invention relates to certain new and useful improvements in machine-tools, and consists more particularly in a machine for planing curved slots in the periphery of a circular work piece, such as a steam turbine bucket.

The principal feature of my invention is the provision of a machine of this type in which the cutting tool is traversed across the face of the work in the arc of a circle, is then reversed through 180° and moved back again over the same path, the tool having been in the meantime fed forward a predetermined amount.

The particular features of novelty in construction and operation of my machine will clearly appear from the following detailed description, taken in connection with the accompanying drawing in which:

Figure 1 is a plan view of the complete machine; Fig. 2 is a vertical longitudinal section through the head-stock in which the tool spindle is mounted; Fig. 3 is a front elevation of said head-stock; Fig. 4 is a cross section of the front end of said head-stock taken on the line 4—4 of Fig. 3; Fig. 5 is a partial rear elevation of Fig. 2; Fig. 6 is a vertical section of the rear part of the head-stock taken on the line 6—6 of Fig. 5, and Fig. 7 is a partial plan view of Fig. 6.

In Fig. 1, the work is represented at 1, the same being mounted on a mandrel 2, provided with an indexing mechanism, which may be of any desired or usual construction and which is indicated as a whole by 3. This indexing mechanism, by means of which the work is rotated step by step to bring a fresh portion of its periphery in position to be operated on by the tool, may be manually operated or so connected up to the driving mechanism of the cutter holder that the work will be automatically intermittently rotated, as is a common construction in gear-cutters, etc.

The cutting or planing tool 4 is held, in a suitable chuck or socket 5, by the spindle 6, which is eccentrically and adjustably mounted in a head 7, journaled in the head-stock 8, and oscillated by means to be described.

The spindle 6 is mounted primarily in a sleeve 9, being keyed therein so as to be capable of longitudinal movement. This sleeve is in turn journaled in the eccentric bore of another sleeve 10, which is rotatably mounted in the bore of the head 7, said last-mentioned bore being also eccentric. Said sleeve 10 is normally held from turning in said bore but can be rotatably adjusted by a worm 11, engaging the worm wheel 12, mounted on said sleeve 10. The worm 11 is carried by the oscillatory head 7.

The means for oscillating the head 7, and thereby reciprocating the tool on an arc-shaped path is as follows: To the rear end of said head is secured a gear 15, with which meshes a reciprocatory rack 16, slidably mounted on the base of the head stock 8 underneath said gear 15. This rack is driven back and forth by any suitable mechanism, such as for example the crank pin and connecting rod, shown diagrammatically in Fig. 1, and constitutes the sole driving member of the machine.

From the foregoing description, it will be seen that, owing to the eccentricity of the bore of the head 7 in which the sleeve 10 is journaled, the tool will move in an arc-shaped path, when said head is oscillated, and that, owing to the eccentricity of the bore of said sleeve 10, the radius of said arc-shaped path of the tool will be varied by turning said sleeve, in the said bore of the head 7, by means of the worm 11. While the head 7 is being oscillated by the reciprocatory rack 16, and is thereby carrying the tool back and forth along an arc-shaped path, the radius of which is determined, as above stated, by the angular position of the sleeve 10 in its bearing, the tool-spindle 6 and the sleeve 9, in which it is keyed, are caused to rotate on their common axis through 180 degrees at each reversal of their said arc-shaped movement. The means for accomplishing this reversal of the tool will now be described.

A gear 17 is secured to the front end of the sleeve 9 and meshes with a gear 18, loosely mounted upon a flanged sleeve 19, journaled on a pin 20, projecting from one arm of a lever 21, pivoted at 22 to the face of the rotary head 7. The gear 18 is frictionally connected to the sleeve 19 by means of the disks 23, of leather or the like, clamped between the flange of said sleeve, the web of the gear and the annular nut 24.

Secured to the sleeve 19 is a pinion 25, which meshes with a gear 26, also pivotally mounted at 22 on the face of the head 7. Said last-mentioned gear 26 runs in mesh with a fixed internal gear 27, secured to the head-stock 8.

Near the end of the sleeve 9 is also secured a collar 28, which has a lug 29 projecting from one side thereof in position to come in contact alternately with a pair of lugs 30', projecting from the face of the rotary head 7. These lugs act as adjustable stops for the collar-lug 29, they having screws 31' adjustably mounted therein, on the heads of which said lug 29 strikes alternately.

The radius of the arc along which the tool travels being varied by turning the eccentric sleeve 10, as above explained the screws 31' are then adjusted so that the tool-holder will be turned through exactly 180°, on each reversal of the rotary head. The gear 18 is kept in mesh with the gear 17 whenever the sleeve 10 is angularly adjusted by adjusting the lever 21 on its pivot. After such adjustment, said lever is locked by tightening up bolt 61, and may also be held against accidental movement by the cam-lock 62. It will be seen that the first effect of the movement of the rack 16 in one direction is to turn the rotary head 7, thereby causing the gear 26 to be rotated by the fixed internal gear 27, said gear 26 in turn driving the pinion 25 and it, through the friction clutch described, the gear 18. The latter, therefore, rotates the tool-holder until the lug 29 strikes the opposite stop-screw 31', whereupon the friction-clutch commences to slip and the rotary-head 7 is driven to carry the tool through the work, until the motion of the rack 16 is reversed, when the operation is repeated in the opposite direction.

As has been stated, the tool and its holder are automatically fed forward at each reversal of stroke. The means for accomplishing this will now be described.

To the rear end of the spindle 6 is swiveled a feed-screw 30, engaging in a nut 31, rotatably carried in a bonnet 32, secured to and projecting rearwardly from the sleeve 9. Nut 31 has keyed to it a ratchet-wheel 33, provided with ratchet clutch-teeth on its inner face which engage with similar teeth on a ring 34, secured to the bonnet 32, the two clutch-faces being pressed together by a spring washer 35, pressed against the ratchet wheel 33 by a nut 36. The purpose of these clutch teeth is to hold the ratchet from turning except when positively actuated. The screw 30 is held against rotation by a key 53, engaging a groove 54 therein, and supported by a screw threaded connection 55 from the bonnet 32. To actuate said ratchet 33, in one and the same direction at each reversal of oscillation of the tool-holder, pawls are provided on the frame, with one of which said ratchet is brought into engagement at the end of each of its arc-shaped movements. At that moment the said pawl is given an impulse by a dog carried on the rack 16, so as to turn said ratchet a predetermined amount. The details of these mechanisms will now be described.

A grooved guide 37 is formed on or secured to the base of the head-stock at the rear, and two brackets 38 and 39 are adjustably secured therein. Journaled in these brackets are the crank-levers 40 and 41, normally held against the adjustable stop-screws 42, 43, by the springs 44 and 45, see Fig. 5.

The rack 16 has secured to it dogs 46 and 47, provided with adjustable screws 48 and 49, which, as the rack reciprocates, strike against the arms of the crank-levers 40 and 41, swinging them and, consequently also the pawl-arms 50 and 51 of the same. These pawl-arms engage alternately with the teeth of the ratchet wheel 33 at the opposite ends of its oscillatory path, which latter is indicated by the dotted line in Fig. 5, and, owing to the fact that one of the dogs strikes one crank-lever above its pivot and the other strikes the other crank-lever below its pivot, both pawls act to turn the ratchet the same way. Thus at the end of each stroke of the rack the ratchet is turned a small amount and the tool spindle is therefore fed forwardly.

In Fig. 5, the rack is almost at the end of its movement to the right, and the screw 48 is just about to strike the arm 40 of the crank lever; when it does so, the other arm 50 of said lever will engage and rotate the ratchet wheel 33 through a predetermined angle, thus feeding the tool forward. The rack then commences its return stroke and in so doing reverses the tool and carries it back through the work, as described. It will be seen, therefore, that the feed of the tool takes place just before the end of one stroke of the rack and the reversal of the tool just after the commencement of the return stroke.

The positions of the brackets 38, 39 are adjustable to correspond to the radius of the curve described by the tool, and the dogs are adjusted so that the pawls will begin to be moved just before the end of the stroke, so that enough motion is left to turn the ratchet-wheel one tooth.

If the indexing mechanism is connected up to the driving-means so that the work is turned a step between each stroke of the tool, then the automatic feed of the latter is thrown out. This is done by disconnecting the springs 44, 45. If each bucket is to be finished before the next one is commenced, then the indexing is not performed automatically by the machine, and the automatic feed of the tool is put into motion.

Having thus described my invention what I claim is:

1. A machine for the purpose described, comprising a rotatable head having an eccentric bore, a sleeve mounted therein, a rotary tool-holder eccentrically mounted in said sleeve, means to angularly adjust said sleeve in said head, driving means connected to said head to oscillate the same, gear connections between said tool-holder and said head, including a friction clutch, and stops to limit the rotary movement of said holder in said head, whereby said tool-holder is turned through a predetermined angle whenever said head is reversed.

2. A machine for the purpose described, comprising a rotatable head, a sleeve eccentrically mounted therein, means for angularly adjusting said sleeve in said head and holding it in adjusted position, a tool-holder rotatably carried in said sleeve, means to oscillate said head, gear connections including a friction clutch between said head and said tool-holder, stops to limit the rotation of said tool-holder in said head, and means operatively connected to said oscillating means to cause said holder to be fed forwardly in said sleeve at each reversal of said head.

3. A machine for the purpose described, comprising a head-stock, a head rotatably mounted therein and provided with gear-teeth, a reciprocating rack meshing with said teeth, a tool-holder carried in an eccentric bore of said head and longitudinally movable therein, a feed screw and nut for said holder, dogs carried by said rack, a ratchet-wheel carried by said nut, and pawl-levers on said head-stock in position to be engaged by said dogs and to engage said ratchet at the end of each oscillation of said head, one of said dogs engaging one of said levers above its pivot and the other dog engaging the other lever below its pivot, whereby the ratchet is turned in the same direction by each dog.

4. A machine for the purpose described, comprising a head-stock, a head rotatably mounted therein, means to oscillate said head, a sleeve eccentrically mounted in the same, means to angularly adjust said sleeve in said head, a tool-spindle rotatably mounted in said sleeve, an annular internal rack secured to said head-stock, a gear on said spindle, adjustable gearing including a friction-clutch between said rack and gear, whereby said spindle is rotated from said head, adjustable stops on said head to limit the rotation of said spindle, whereupon said clutch slips until the motion is reversed, and means operatively connected with said oscillating means to feed said spindle forward step-by-step.

5. In a machine for the purpose described, the combination with the tool-spindle, of a head having an eccentric bore in which said spindle is journaled, gear-teeth on said head, and a reciprocatory rack meshing therewith to oscillate said head, planetary gearing carried by said head and arranged to rotate said spindle, a slip-clutch interposed on said gearing, stops on said head to limit the rotation of said spindle, and means carried by said rack to cause said spindle to be fed forward at each oscillation of said head.

6. In a machine for the purpose described, the combination with the tool-spindle, of an oscillatory head having an eccentric bore, a sleeve angularly and adjustably mounted therein and having an eccentric bore, a second sleeve rotatably mounted in said last-mentioned bore, said tool-spindle being slidably carried in said second sleeve, gearing connecting said second sleeve and head, whereby when the latter is oscillated the former is rotated, stops on said head to limit the rotation of said second sleeve and spindle, a slip-clutch in said gearing, a screw connected to said spindle, a nut on said screw provided with ratchet teeth, pawl-levers adjustably mounted in position to engage said ratchet-teeth alternately at the end of each oscillation of said head, a reciprocatory member to oscillate said head, and dogs on said member to actuate said pawl-levers.

7. In a machine of the class described, the combination of a tool-spindle, a rack to reciprocate and gearing to rotate the same, a feed-screw swiveled to the end of said spindle, a nut, having a ratchet-wheel, engaging said screw, dogs on said rack, pawl-levers mounted in position to be engaged by said dogs and to actuate said ratchet-wheel to turn the same in the same direction.

In testimony whereof I have affixed my signature, in presence of two witnesses.

GOMPEI KUWADA.

Witnesses:
W. EBIHARAH,
ICHIRO TADZUKI.